(12) United States Patent  
Lerner

(10) Patent No.: US 6,666,436 B1
(45) Date of Patent: Dec. 23, 2003

(54) MIXED-SIZE PACKED BEDS

(75) Inventor: Bernard J. Lerner, Pittsburgh, PA (US)

(73) Assignee: Beco Engineering Co., Oakmont, PA (US)

( * ) Notice: Subject to any disclaimer, the term of this patent is extended or adjusted under 35 U.S.C. 154(b) by 0 days.

(21) Appl. No.: 10/254,423

(22) Filed: Sep. 25, 2002

(51) Int. Cl.[7] .................................................. B01F 3/04
(52) U.S. Cl. .................................. 261/95; 261/DIG. 72
(58) Field of Search ....................... 261/94, 95, DIG. 72

(56) References Cited

U.S. PATENT DOCUMENTS

| | | | |
|---|---|---|---|
| 2,055,162 A | 9/1936 | Weber | |
| 2,271,671 A | 2/1942 | Wible | |
| 2,763,475 A | * 9/1956 | Dennis | 261/DIG. 72 |
| 3,122,594 A | * 2/1964 | Kielback | 261/DIG. 72 |
| 3,285,587 A | 11/1966 | Huber | |
| 3,429,654 A | * 2/1969 | Friedrichsen et al. | 261/DIG. 72 |
| 3,506,696 A | 4/1970 | Baker et al. | |
| 3,595,626 A | * 7/1971 | Sowards | 261/DIG. 72 |
| 3,957,931 A | 5/1976 | Ellis et al. | |
| 4,002,705 A | 1/1977 | McKeown | |
| 4,203,934 A | 5/1980 | Leva | |
| 4,203,935 A | 5/1980 | Hackenjos | |
| 4,316,863 A | 2/1982 | Leva | |
| 4,333,894 A | 6/1982 | Hoppe et al. | |
| 4,554,114 A | 11/1985 | Glen et al. | |
| 4,724,593 A | 2/1988 | Lang | |
| 5,063,000 A | 11/1991 | Mix | |
| 5,236,663 A | * 8/1993 | Alagy et al. | 261/94 |
| 5,242,626 A | 9/1993 | Oshima | |
| 5,262,012 A | * 11/1993 | Smith, Jr. | 261/DIG. 72 |
| 5,302,361 A | 4/1994 | Nagl | |
| 5,338,518 A | * 8/1994 | Marion et al. | 261/94 |
| 5,543,088 A | 8/1996 | Halbirt | |
| 5,618,412 A | * 4/1997 | Herding et al. | 261/DIG. 72 |
| 5,670,095 A | 9/1997 | Southam | |
| 5,679,290 A | 10/1997 | Cameron et al. | |
| 6,007,915 A | 12/1999 | Rukovena | |
| 6,182,950 B1 | 2/2001 | Fan | |
| 6,371,452 B1 | 4/2002 | Shojaie | |
| 6,425,574 B1 | 7/2002 | Sunder | |

* cited by examiner

Primary Examiner—C. Scott Bushey
(74) Attorney, Agent, or Firm—William L. Krayer

(57) ABSTRACT

An improved random-dumped packed bed for effecting inter-phase heat and mass transfer. The packed bed is a plurality of a first packing size substantially uniformly mixed and co-mingled with a plurality of the suitable second larger packing size. The mixed bed so formed provides the additional surface area and mass transfer capacity of the plurality of the added first smaller packing size while maintaining the gas and liquid limiting flow capacity of a bed of the second larger packing size absent the smaller first packing size.

17 Claims, 4 Drawing Sheets

KOCH FLEXIRINGS®

KOCH FLEXIRINGS®

MIXED-SIZE PACKED BEDS

FIELD OF THE INVENTION

This invention relates to packed bed assemblies of random-dumped packings used for mass and heat transfer operations between two fluids, typically operations such as gas absorption and desorption, distillation, liquid extraction, and the like.

BACKGROUND OF THE INVENTION

Extended-surface, random-oriented, packed beds for mass and heat transfer applications are widely used in industry, typically for gas-liquid and liquid-liquid contact. While most packed bed assemblies comprise vertical cylindrical columns employing countercurrent gas-liquid flow, referred to as packed towers, horizontal gas flow units are also known to the art, and are referred to as cross-flow contactors. To save energy and capital costs in either vertical or horizontal flow configurations, industry requires the highest flow capacities and lowest pressure drops for the packed bed contacting media. These objectives have been partially met in recent years primarily through the use of larger packing sizes.

At equal gas and liquid flows or loading rates in random-dumped beds, larger packing sizes of a given shape and design have relatively lower pressure drop and mass transfer performance than the smaller packing sizes. Because of their higher void space, both as individual packing elements, i.e, packing pieces, and as a packed bed, assemblies of the larger packing sizes also have higher limiting liquid and gas flow capacities (loading and flooding) than the smaller sizes of the same design. However, the gain in gas and liquid flow capacity for the larger packing sizes comes at the expense of lower mass transfer performance. The larger packing sizes have lower packing densities, i.e., lower number of packing elements per cubic foot and higher fractional void volumes, than do the smaller size packing elements of the same design. At the higher liquid loadings allowed by the lower packing density, the higher voidage of packed beds of the larger size packings results in increased gas axial back-mixing and loss of the desired countercurrent gas-liquid flow.

Various geometric packing shapes and configurations have been used in attempts to minimize the loss in transfer performance with increasing tower packing size. Nevertheless, for any given packing design, a significant portion of the gain in reducing tower diameter through the use of larger, higher flow capacity, packing sizes is offset by the deeper bed depth required to achieve the desired degree of mass transfer efficiency.

Most random tower packings have shapes that provide anisotropic gas flow resistance—that is, they are relatively "open" for gas and liquid flow along one axis, and have a higher amount of planar or filamentary deflection surfaces along the transverse axis. Examples of packings with this property include cylindrical packings such as Raschig and Pall rings, spherical packings such as Jaeger Tri-Packs®, as well as most plastic packings made by injection molding. To facilitate release from the mold, injection-molded packings necessarily have relatively high projected open area in the release direction, and typically, not in the transverse direction. Thus, these packings are highly anisotropic with respect to fluid flow resistance.

Within a packing element, gas and liquid flow will tend to take the path of least resistance, or through the "open" or mold release direction. While the random orientation of the elements in the bed is depended on to overcome this adverse property, gas flow macro-direction changes in the bed will be of the order of the packing size. In the smaller packing sizes, gas flow direction changes occur frequently with respect to the bed depth, and gas mixing is adequate. However, for the larger packing sizes the number of flow direction changes per foot of packing depth may be low enough to result in poor gas mixing. For example, a packed bed of 1-inch anisotropic packing elements would theoretically tend to have approximately 10–12 gas flow macro-direction changes per foot of packed depth. On the other hand, a 3½ inch size packing would tend to have only 3 to 4 gas flow direction changes per foot of depth. This contributes to the loss in mass transfer performance with an increase in packing size in anisotropic packing elements. This characteristic has been tacitly acknowledged by the development of "shallow" packing shapes that have a relatively short axial depth, such as those disclosed in U.S. Pat. Nos. 3,957,931 and 6,007,915. There are additional parameters, such as the degree of liquid mixing and surface renewal frequency, whose contribution to transfer efficiency decreases with an increase in packing size for a given packing shape and style.

PRIOR ART

The use of sections or zones of different packing sizes has been taught in the prior art to resolve some specific packed bed problems. For example, because of the typically lower volumetric density of tower packing adjacent to the containing wall, the flow resistance in this area is less than in the center of the packing. Gas and liquid tend to channel along the wall, a phenomenon known as "wall effect". Cameron and Bharga, in U.S. Pat. No. 5,679,290, teach the use of two different sizes of packing in order to overcome wall effect and to obtain uniform gas flow across the column diameter. In '290, Cameron and Bharga use a plurality of a first packing size in an annulus adjacent to an upper part of the tower wall and a second plurality of a larger packing size in the core of the column in order to obtain uniform gas flow through the tower cross-sectional area.

Because flooding often occurs as a result of the restricted flow area adjacent to the packing support tray in counter-current flow columns, it is known in the art to provide for higher flooding capacities by using a zone of a larger packing size on the support tray, and then a smaller packing size in the remainder of the column. It is also known in the art to use a zone or layer of smaller packing size on top of a larger column packing size in order to enhance initial liquid distribution. Various assemblies of zones and layers of packing elements are illustrated in the following Weber U.S. Pat. No. 2,055,162, Wible U.S. Pat. No. 2,271,671, Huber U.S. Pat. Nos. 3,285,587, 3,957,931, McKeown U.S. Pat. No. 4,002,705, Hoppe U.S. Pat. No. 4,333,894, Oshima U.S. Pat. No. 5,242,626, Nagl U.S. Pat. No. 5,302,361, and Sunder U.S. Pat. No. 6,425,574. The zones of packing elements proposed in these and other prior art disclosures may be random or ordered, or combinations of one or more random or ordered zones or layers or packing elements. In none of the prior art of which I am aware, however, are two different packing sizes mixed with each other or completely co-mingled for use either as the sole packed bed contacting means or as the makeup of a bed, layer, or zone in a combination of beds, layers or zones.

OBJECT OF THE INVENTION

It is an object of the invention to provide a method and apparatus for mass or heat transfer between two fluids in the form of a random-dumped packed bed having improved mass transfer performance combined with high limiting flow capacities.

SUMMARY OF THE INVENTION

This invention combines the supplemental surface area and mass and heat transfer capacity of a plurality of a first packing size with the lower pressure drop and increased gas and liquid flow capacity of a plurality of a suitable second larger packing size, by mixing the two sizes to obtain a substantially uniform mixture of the two disparate packing sizes. Mixing of the two packing sizes to a substantially uniformly dispersed mix may be done by any conventional means such as a tumbling drum, or controlled volumetric metering or a combination thereof. The mixed bed of this invention provides for the contribution of the supplemental mass and transfer area of the small packing size fraction while substantially retaining the higher limiting flow capacities of a bed of the larger packing size in which the smaller size packing elements are embedded.

Additional advantages accruing to the mixed-size packed bed of this invention include more uniform fluid flow, including possible alleviations of wall effect, and reduced axial back-mixing. A characteristic of a random-packed bed is that the size of the interstitial void spaces increases as the packing size increases. The interstitial voids are areas of zero flow resistance and zero active mass and heat transfer surface, except for liquid drop free fall therethrough. The interstitial voids between packing elements can also create low-resistance by-pass routes for gas and liquid, causing liquid channeling as well as gas axial back-mixing. These latter effects impair the desired countercurrent gas-liquid contact in a vertical packed column and result in lower contact efficiencies in a cross-flow contactor. Partially filling the interstitial inter-element voids of a packed bed of a larger size packing with smaller packing pieces replaces the empty void spaces with supplemental mass and heat transfer area, and provides for more uniform gas flow resistance and augmented liquid collection and re-distribution.

By studying shapes such as rings and spheres, it is possible to establish the general factors governing selection of the size mixture that will provide a uniformly dispersed and stable mixed bed in the method and apparatus of this invention. A mixture of packing sizes in which the volume of a smaller packing piece is approximately equal to, or greater than, the interstitial inter-element void space between the larger size packing elements provides mixed bed stability and is the preferred mixture. When the smaller packing element volume is larger than the average interstitial inter-element void space of the larger packing size bed, the final mixed bed volume is greater than the sum of the individual bed volumes of the two packing sizes prior to mixing. Because packings are sold on the basis of volume, this property is economically advantageous.

Certain packing shapes or designs, particularly packing elements with external projections or ridges, tend to resist settling and may have unusually high interstitial or non-uniform inter-element void space. In such cases, attempts to mix in a packing size that is substantially smaller than the interstitial void space between packing elements may lead to separation, non-uniform distribution or difficulty in mixing. For example, attempts at mixing 1¼-inch Jaeger Tri-Packs® with 3½-inch Jaeger Tri-Packs® gave beds where the smaller packing pieces fell through the interstitial voids of the larger packing and did not remain dispersed.

While the size and shape of inter-element void spaces will vary with the design and size of the packing elements, void spaces are typically formed between more than two elements; that is, a grouping of elements. The number of the void spaces in a packed bed is therefore significantly less than the number of packing elements comprising the bed. Because the number of packing elements per unit volume increases rapidly with a decrease in nominal size, as is illustrated by the data of Table 1 for spherical and ring packings, relatively small volume percentages of a smaller packing size are required to substantially fill the void spaces of a random bed of a second larger size packing element.

TABLE I

Number of Packing Elements per Cubic Foot

| Jaeger Tri-Pack ® Size, inches | Number/Cu.Ft. | Koch Flexirings ® Size, inches | Number/Cu.Ft. |
|---|---|---|---|
| 1 | 2300 | 1 | 1464 |
| 1¼ | 1637 | 1½ | 438 |
| 2 | 355 | 2 | 187 |
| 3½ | 48 | 3 | 25 |

In working with various combinations of packing elements to be used in my invention, the percent by volume in a bed and the percent by number of a given packing element in the bed can be calculated from a table such as Table 1, which can readily be made up for design configurations of packing elements other than those in Table 1. As an example, a 10% by volume mix of a nominal 1¼-inch size Jaeger Tri-Packs® (1637 pieces per cubic foot) with a nominal 2-inch size Tri-Packs® (350 pieces per cubic foot) contains 162 1¼-inch size packing elements and 315 2-inch packing elements, or a mix containing 34% by number of the smaller packing size. A 20% volumetric mix of the smaller 1¼-inch size will contain 325 1¼-inch pieces and 280 2-inch pieces, yielding a mix that contains 53.7% by number of the smaller packing size. Similarly, a mixture of only 10% by volume 1-inch Koch Flexirings® (1464 pieces/cubic foot) and 90% 1½-inch Koch Flexirings® (438 pieces/cubic foot) produces a packed bed containing 27% of the 1-inch rings by number.

There are a variety of packing shapes and geometries, including cylinders, spheres, saddles, etc., and the configuration and size of the interstitial inter-element voidage varies with the packing geometry and packing size. In addition to the well-known Jaeger Tri-Packs® and Koch Flexirings® mentioned above, see the variously configured packing elements disclosed in the following Ellis U.S. Pat. No. Ellis 3,957,931, Leva U.S. Pat. No. 4,203,934, Hackenjos U.S. Pat. No. 4,203,935, Leva U.S. Pat. No. 4,316,863, Glen et al U.S. Pat. No. 4,554,114, Lang U.S. Pat. No. 4,724,593, Halbirt U.S. Pat. No. 5,543,088, Southam U.S. Pat. No. 5,670,095, Rukovena U.S. Pat. No. 6,007,915, Fan U.S. Pat. No. 6,182,950, Shojaie U.S. Pat. No. 6,371,452, and Sunder U.S. Pat. No. 6,425,574. My invention may be used with any of these or any other commercially available packing elements. This diversity of packing elements, however, suggests that preliminary testing of mixtures of a given packing design may be useful in order to suitable or optimum size mixtures for the application of this invention.

In the method and apparatus of this invention, the volume percent of the smaller packing size of the total packing volume is from 5 to 50%, and preferably from 5 to 30%. The appropriate volume and number mixture of sizes may be estimated from the piece count per unit volume data for each selected packing type and size combination by anyone skilled in the art of packed bed design. Alternatively, interstitial void volumes may be visually measured or estimated by mixing test quantities of the different packing sizes in a suitable container.

Precise calculations of the volumes of either the packing elements or the void spaces are difficult to make, particularly in view of the many different designs. Accordingly, as used herein, the term "size" is not an absolute, but a relative, term. The relative size of a packing element may be arbitrarily taken as equal to the volume occupied by a given number of randomly dumped packing elements divided by that number. For example, if 1000 packing elements A fill a cubic foot when randomly dumped, then the relative size of packing element A may be taken as equal to 0.001 cubic feet, or 1.73 cubic inches. Referring to Table 1, although they are both nominally designated as "1-inch" sizes, using the foregoing definition, the 1-inch Jaeger Tri-Packs® have a relative sized of 0.75 cubic inches as against 1.18 cubic inches for the Koch Flexrings®.

As used herein, the term "interstitial inter-element void space" is also a relative term—that is, it represents an average of the volumes of the voids between contacting or nearly contacting packing elements. The average void volume between groups or assemblies of the packing elements is related to the relative size of the packing elements for a given configuration—that is, the larger the packing element size, the larger the void space between assemblies of the packing. Therefore, the relative interstitial inter-element voids may be taken as directly proportional to the relative size of the packing element as determined above. As used herein, when I refer to a packing element B which is of a size substantially equal to the average size of the interstitial void spaces of a random packed bed of a given type and size of packing element, I mean it has a size which, when distributed substantially evenly throughout a bed of the elements A, will occupy the void spaces in the bed of larger elements A while neither increasing the total volume of the bed nor falling through the void spaces.

Preferred mixture percentages may also be based on the relative cost increase of the mixture compared to the base price of the larger packing size. For example, the prices of polypropylene Jaeger Tri-Packs®, in the nominal 2-inch and 3½-inch sizes, are currently $14.24 and $9.36/cubic foot, respectively. From Table I, 5% by volume of the 2-inch size would have 18 elements, representing a cost of $0.72. The 95% of the 3½ inch packing, or 46 pieces, would cost $8.97, giving a total cost for the mixture of $9.69. This is only $0.33 more per cubic foot than the $9.36/CF of the larger packing size, or a 3.1% increase, assuming volume additivity. However, tests show that, for this combination of packing sizes, the volumes are more than additive (the 2-inch polypropylene Jaeger Tri-Packs® packing is larger than the average interstitial voids of the bed of the 3½ inch packing size) so that the percent cost increase would be even less than 3%. For this size mixture of polypropylene Jaeger Tri-Packs®, there would be 18 of the 2-inch elements mixed with 46 of the 3½ inch elements, giving a number percentage of 28% of the smaller packing size for a nominal 5% volumetric mix.

DETAILED DESCRIPTION OF THE INVENTION

Figure 1:
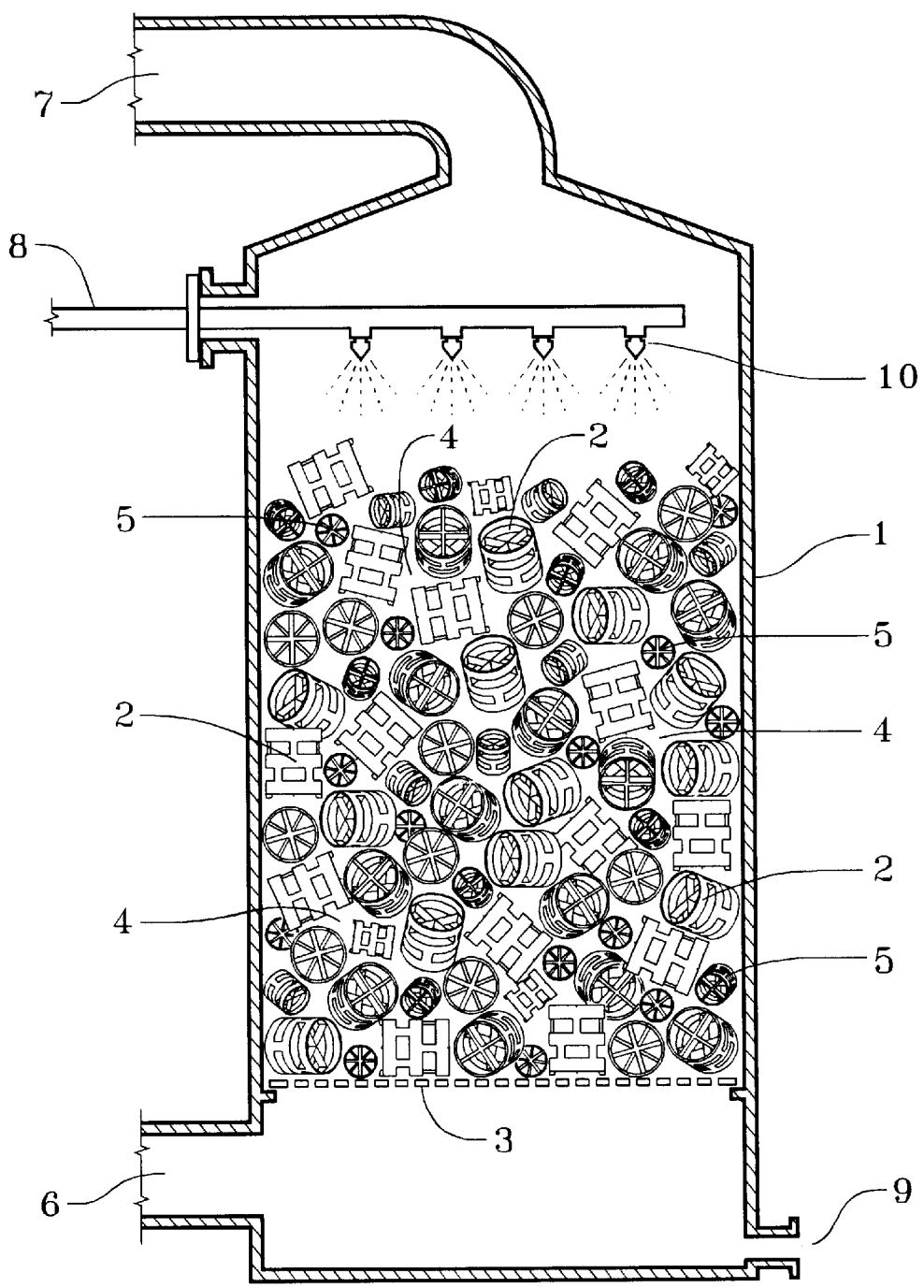
FIG. 1 is a sectional view of a random packed bed of the invention.

A preferred embodiment of the invention is described with reference to FIG. 1, which is a diagrammatic view of an embodiment of the invention with parts broken away to show details of the packed bed of the invention. A housing, 1, contains a random-dumped bed comprised of a major volumetric fraction of a packing 2 having interstitial voids 4, which are occupied by packing elements 5, smaller than the packing elements 2, and approximately equal in volume to the average size of the interstitial voids 4. Packing elements 2 and 5 may be said to be co-mingled, or homogeneously mixed. The bed of packing elements 2 and 5 rests on perforated plate 3. Housing 1 is illustrated with gas inlet 6, gas outlet 7, liquid inlet 8 having spray nozzles 10, and liquid outlet 9. Both the larger packing elements 2 and the smaller packing elements 5 are of the same design, in this case Koch Flexrings®. They have been mixed by tumbling and accordingly are randomly oriented and randomly but substantially homogeneously interspersed. The particular shape and design of housing 1 should be understood as illustrative only as a device for holding the bed of the invention.

SPECIFIC EXAMPLE

Testing of pressure drop as a function of air flow rate and limiting flow capacities was done for two different packing types: a "planar-surface" ring packing and a "filamentary" spherical packing. The packings tested included Koch Flexirings®, a Pall ring type, and a spherical filamentary packing, Jaeger Tri-Packs®. An 11½-inch inside diameter, vertical acrylic tube was used as the packed bed housing to allow visual observation of the gas-liquid interaction. Ambient air was blown up through the housing by means of a Cincinnati Size No. 15 centrifugal blower. The air flow rate was controlled by means of a throttling damper on the blower inlet and metered by means of a pitot tube located in a horizontal 6¼ inch diameter, 5-foot long, duct run from the blower discharge to the inlet of the test column. Pilot tube pressure differential was measured by means of an Ellison inclined draft gage. The air velocity through the vertical test section was calculated from the ratio of the respective airflow cross-sectional areas of the suction duct and the test column.

The bottom section of the test column was 32" in length and served as the water-air disengaging space. This section contained a 6-inch diameter inlet duct surmounted by a 9-inch diameter rain-cap. The middle tower section, 42½ inches in length, served as the test packed section. Packing was supported on a 1×1 mesh support screen located at the bottom of the middle section, and a fixed bed depth of 36 inches was used for all tests. In those cases where the volume of the mixed bed was greater than the sum of the volumes of the two packings prior to mixing, the bed depth was corrected to 36 inches by removing packing pieces in proportion to the number composition of the mix. The top section of the column was 20 inches in length and contained the recycle liquid spray nozzle and a mist eliminator.

Water was sprayed on the top of the packing countercurrent to upward air flow at a rate controlled by a manual valve and monitored by means of a 0–25 GPM rotameter. Water drained from the column to a 55-gallon recycle tank from which it was pumped to the spray nozzle by means of a Model 7 Teel pump having a capacity of 8 GPM at 50 psig. Water flow rate was controlled and set by means of a bypass valve on a tee connection on the pump discharge line running back to the 55-gallon recycle tank.

A test run was made by setting the water flow rate to a fixed value and increasing the air flow rate to either the limit of the blower output or the flood point. Pressure drop across the packing was measured for each air flow rate value by means of a pressure taps located above the packing and below the packing support screen, using a Dwyer manometer with a range of 0 to 10 inches water column to measure the packing pressure differential. Pressure drop for the 36" depth of packing was measured for each air flow rate setting.

Base runs were made for the different water rates on packed beds of the individual size packings that were to be mixed. For example, base runs were made on 1-inch and 1½ inch Koch Flexirings® at 5.95 GPM, using a Bete Fog Nozzle Company TF12FCN spray nozzle for liquid irrigation at the top of the bed. The data for the pressure drop of the 3-foot packed depth versus tower air velocity curves for these two base runs are presented in FIG. 2. The near-vertical rise in pressure drop, which indicates the flood point, occurred at respective velocities of 370 and 440 feet per minute for the 1-inch and 1½ Flexirings®.

Runs were made on a mixture of 1-inch and 1½ inch Koch Flexirings®, in which case the 1½" rings were the "large" size and the 1-inch rings the "small" size. Runs were made at volumetric mixes of 10, 20 and 30% of the small size Flexirings® with respective 90, 80 and 70% volumes of the larger size rings. Liquid rates varied from 0 to 5.95 GPM, and gas velocities, based on superficial tower area, were varied from 190 to 550 feet per minute.

Figure 2:
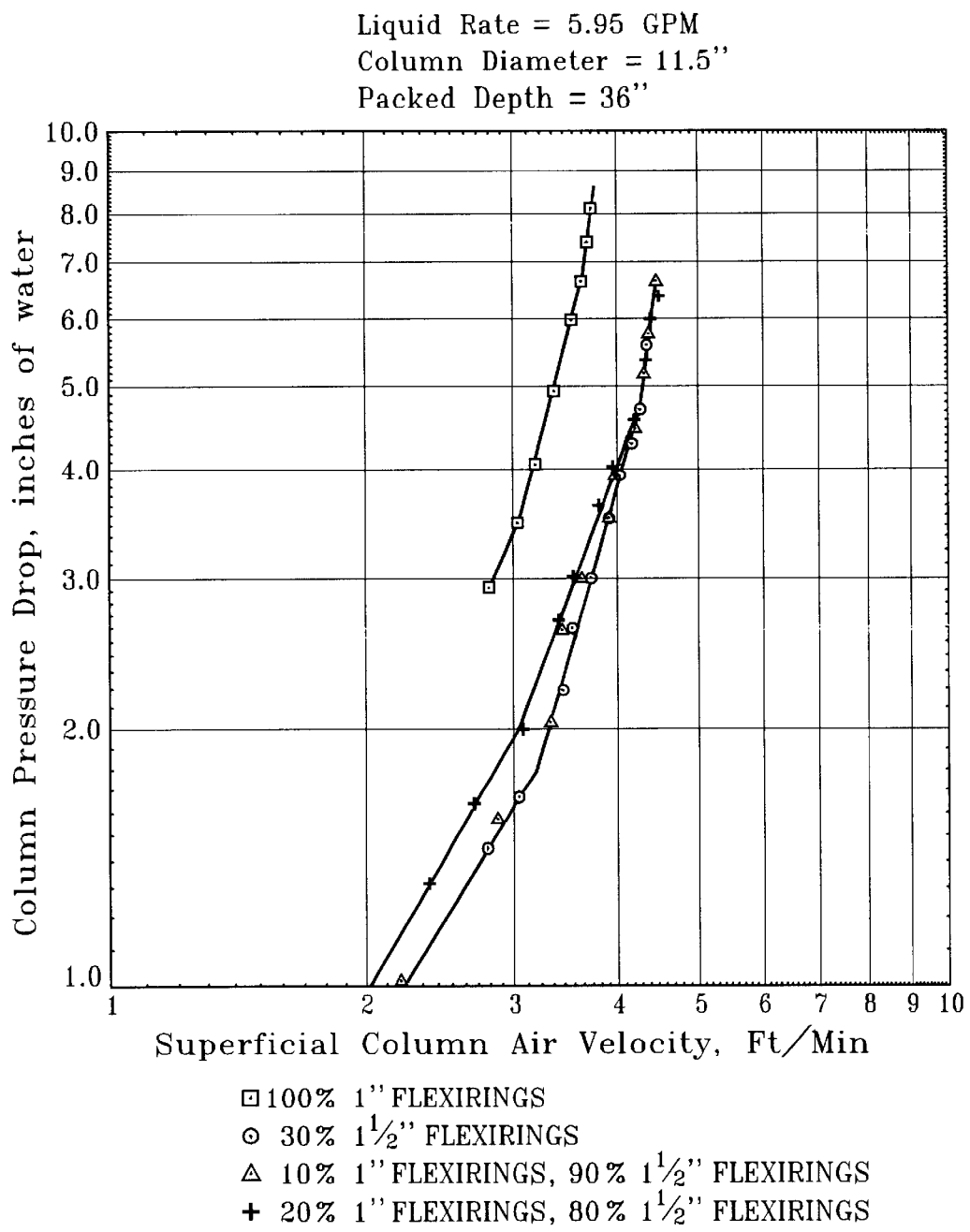
FIG. 2 is a plot of air velocity versus pressure drop in a mixed bed of my invention compared to separate beds made up solely of the separate components of the mixed bed.

On the log-log plot of FIG. 2, the data points on the pressure drop-air velocity curve for the 10 percent by volume 1-inch Flexirings® mixture with the 1½ inch Flexirings® fall on the base line for the bed of 100% 1½ inch packing size over the entire range of air flow rates tested. In view of the fact that the 1-inch size comprises 27% by number of packing pieces of the total bed, this apparent total absence of influence on either the pressure drop or limiting flow with reference to the 100% 1½ inch Flexirings® base line is surprising. At low air velocities, for the 20% 1-inch ring mixture comprising 59% by number of the total packing pieces, the pressure drop of the mixed bed is slightly higher than that of the 100% 1½ inch ring bed. However, the pressure drop line for the 20% 1-inch ring mixed bed converges with the base line for the larger 1½ inch size packed bed line and the loading and flooding region lines become virtually the same.

One reason for the convergence of the pressure drop lines is that the pressure drop differential between the base 1.5-inch ring bed line and the 20% mixed-bed line is of the order of only 0.25 inches for the 3-foot packed depth. This is a differential of less than 0.1 inches water per foot of packed depth. Due to the nature of a log-log plot, the 0.25 inch differential represents a greater scalar distance at low pressure drop values than at the higher values, and the pressure drop differential is only noticeable by reason of the magnification of scale by the log-log plot at low values.

Figure 3:
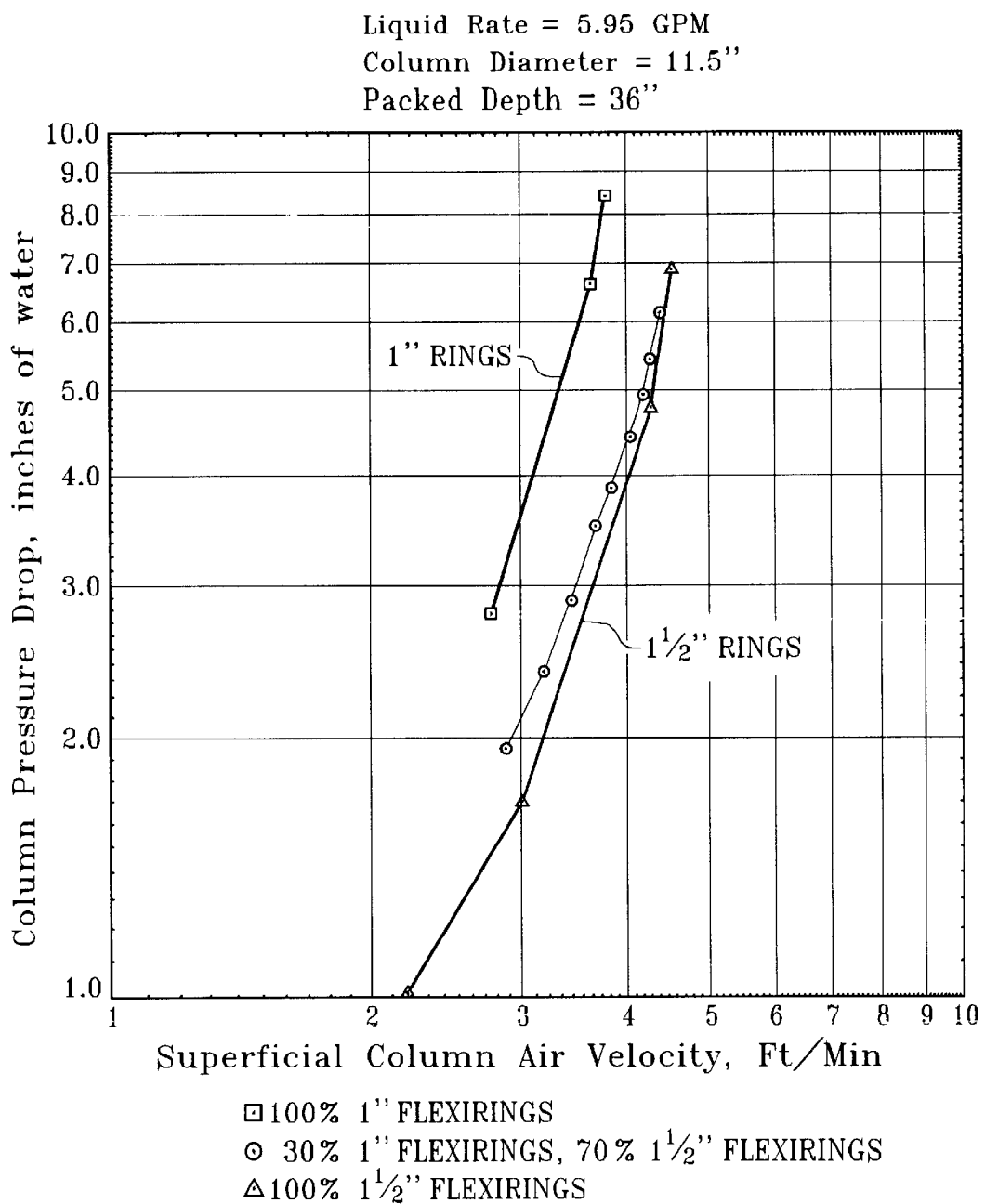
FIG. 3 is a plot similar to that of FIG. 2, using a different mixture.

For clarity, FIG. 3 plots the pressure drop vs. velocity data for the 30% mix of the 1-inch Flexirings® with the 1½ inch Flexirings®, compared with the base run lines for beds of the separate packing sizes, all at the 5.95 GPM water rate. Again, the 30% by volume mixed bed of 1-inch rings pressure drop-gas velocity line converges with the base line of the 100% 1½ inch ring bed in the loading range, and the flood-limiting velocity of the two beds is identical. Also, the pressure drop curve for the 30% 1-inch mixed bed of FIG. 3 is identical to the line for the 20% 1-inch mixed bed of FIG. 2, indicating no effect on the pressure drop or limiting flow behavior of the mixed bed in increasing the content of the smaller packing size from 20 to 30% by volume, or 46 to 59% by number.

The fact that the lines coincide in the load and flood region means that the liquid and gas capacity of the larger packing size is unaltered by the addition of 30% by volume, or 59% by number, of the smaller packing size. The data for the 10–30% by volume mixed beds of Flexirings® demonstrates that, contrary to all expectations, the additional surface and mass transfer area of a smaller packing size apparently can be added to, and mixed with, a suitable larger packing size, without sacrificing any of the higher flow capacities of the bed of the larger packing size absent the added smaller packing size fraction.

Figure 4:
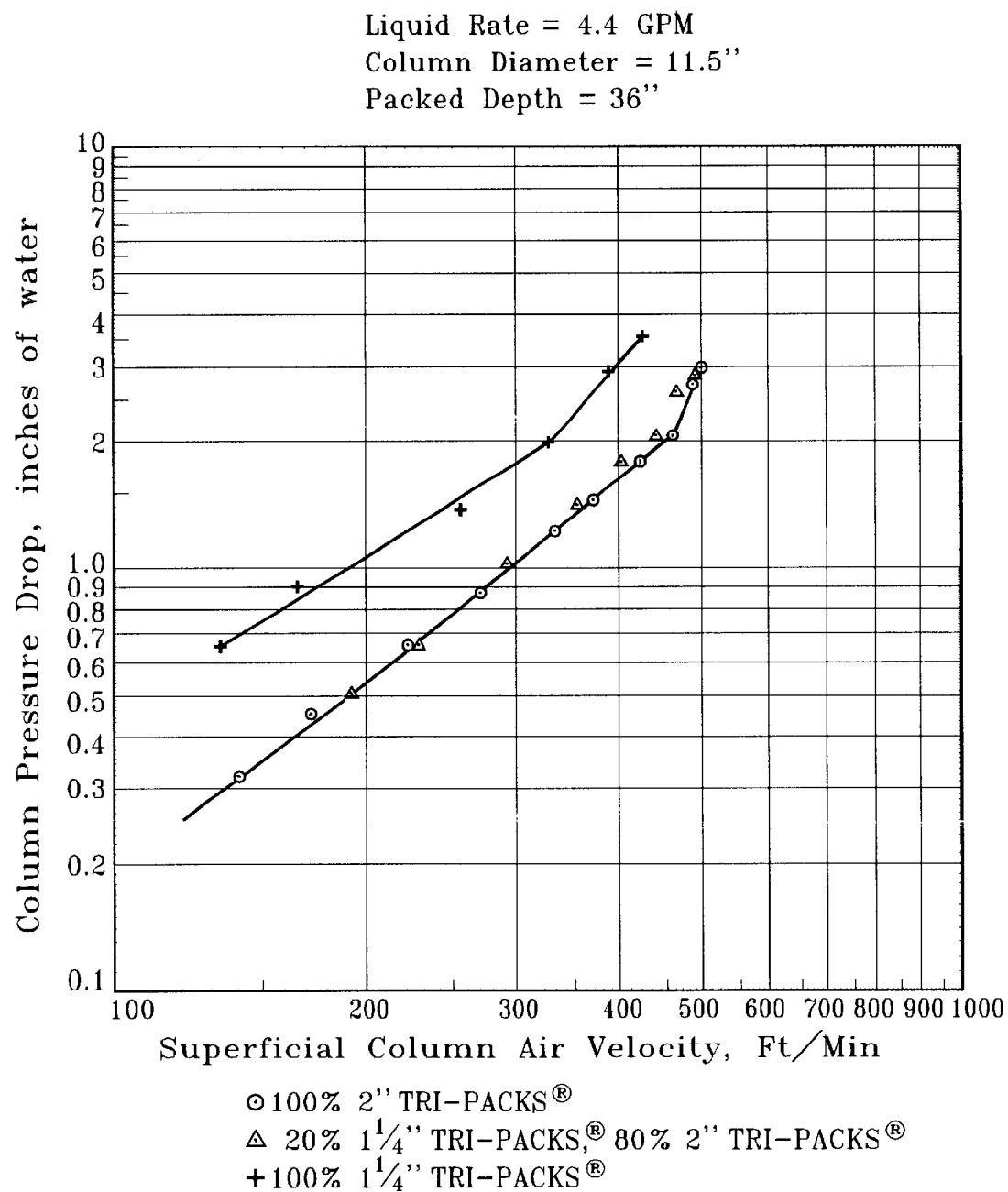
FIG. 4 also plots the air velocity versus pressure drop in a similar demonstration of the advantages of the invention.

Tests were also made on 10 and 20% by volume mixes of 1¼ inch Tri-Packs® with 2-inch Tri-Packs®. Tri-Packs® are a spherical filamentary packing, disclosed in U.S. Pat. No. 4,203,935, and this shape and design provides a lower density, higher voidage and lower pressure drop bed than do cylindrical planar ring packings of the same equivalent size. FIG. 4 presents pressure drop vs. column air velocity plots for the separate beds of the 1¼-inch and 2-inch size Tri-Packs®, as well as the plot for a 20% by volume mix of the 1¼ inch size with 80% of the 2-inch size, all at a liquid rate of 4.4 GPM. For this spherical packing shape, the pressure drop vs. air velocity line for the 10 and 20 percent by volume 1¼ inch size mixed bed was indistinguishable from the base line of the 2-inch Tri-Packs® bed. Not only were the loading and flooding regions virtually identical, but the pressure drop for the mixed bed in the low air velocity pre-load region was also the same as that for the 100% 2-inch size bed alone.

Based on these data, it is apparent that, for filamentary packings such as Tri-Packs®, mixing a volumetric fraction of 20% of a smaller size packing with a bed of a larger packing size has no apparent effect on either the pressure drop or the limiting flow capacities of the bed of the larger packing size. For a planar packing, mixing a 20% or 30%. volumetric fraction of a smaller size packing with a bed of a larger packing size increases the pressure drop by a relatively small amount, but for both filamentary and planar packings, the mixed bed has the same limiting flow capacity of the bed of the larger size packing, absent the volumetric fraction of the added small packing size.

A tentative explanation for this unexpected property of the mixed bed of packing sizes is that the larger size packing surrounding the small packing pieces acts to absorb or drain away any excess liquid tending to accumulate in the smaller-size packing elements. Because loading and flooding are characterized and defined by increases in liquid holdup, along with reduced free area for gas flow, a reduction in localized liquid holdup serves to un-load or un-flood the packing. Thus, even when they are the dominant packing by number, the smaller packing pieces cannot achieve loading or flooding conditions until the surrounding larger packing loses its ability to accept additional liquid loads. The latter limit occurs for the large packing size only in its own loading zone and flood region. The smaller packing can reach its loading and flooding limits only when and if the adjacent larger packing size reaches its limits. Therefore, in a mixed bed, both packings share the same capacity limits of a bed of the larger packing size. Visual observation of the mixed bed as flooding was approached appeared to confirm this mechanism. While this mechanism appears to be controlling the limiting flow capacity of the mixed-size packed bed, it is understood that this invention is not dependent on, or otherwise limited to, or by, this tentative explanation of the high-capacity phenomenon of the bed of mixed packing sizes.

The mixed-size bed of this invention may also be comprised of a mixture of packing sizes of different packing designs. For example, from Table I, the 1¼-inch Jaeger Tri-Packs® have approximately the same number of packing elements per cubic foot as the 1-inch Flexirings®, and thus, similar packing element volumes. The 1-inch Flexirings® are therefore interchangeable with the 1¼ Jaeger Tri-Packs® in the test mixtures of 1¼-inch Tri-Packs® with the 2-inch Tri-Packs®. Conversely, the 1¼ inch Tri-Packs® are interchangeable with the 1-inch Flexirings® in the test mixtures of the 1-inch and 1½ inch Flexirings®. In general, mixtures of packings of different geometries and designs may be made on the basis of equivalent packing element volumes for those mixtures meeting the criterion of no substantial change in the limiting fluid loading values of a bed of the larger packing element size absent the smaller packing element size. Applying the latter criterion of no substantial change in the fluid loading limits of the largest packing size, the mixed bed of this invention may also be comprised of more than two different sizes of packings.

What is claimed is:

1. A non-mobile packed bed of non-catalytic extended surface packing elements for effecting heat or mass transfer comprising (a) non-catalytic extended surface packing elements A having a substantially uniform configuration and a substantially uniform size, co-mingled with (b) non-catalytic extended surface packing elements B smaller than packing elements A and having substantially the same substantially uniform configuration as packing elements A.

2. A bed of claim 1 wherein said packing elements B are at least as large as the average interstitial inter-element void space which would be formed in a bed of packing elements A alone.

3. A bed of claim 1 having a limiting flow capacity at least 90% of that of a bed of packing elements A alone.

4. A bed of claim 1 which is random-dumped.

5. A bed of claim 1 wherein either (1) the percent by number of said elements B is from 10% to 65% of the total number of elements in said bed or (2) the percent by volume of said elements B is 5% to 50% by volume of the total volume of said bed.

6. A bed of claim 1 wherein either (1) the percent by number of said elements B is from 20% to 55% of the total number of elements in said bed or (2) the percent by volume of said elements B is 5% to 30% by volume of the total volume of said bed.

7. A packed bed of claim 1 wherein said packing elements B are of a substantially uniform size and wherein either (1) the percent by number of said elements B is from 10% to 65% of the total number of elements in said bed or (2) the percent by volume of said elements B is 5% to 50% by volume of the total volume of said bed.

8. A packed bed of claim 1 wherein either (1) the percent by number of said elements B is from 20% to 55% of the total number of elements in said bed or (2) the percent by volume of said elements B is 5% to 30% by volume of the total volume of said bed.

9. A bed of claim 2 wherein either (1) the percent by number of said elements B is from 10% to 65% of the total number of elements in said bed or (2) the percent by volume of said elements B is 5% to 50% by volume of the total volume of said bed.

10. A bed of claim 2 wherein either (1) the percent by number of said elements B is from 20% to 55% of the total number of elements in said bed or (2) the percent by volume of said elements B is 5% to 30% by volume of the total volume of said bed.

11. A bed of claim 3 wherein either (1) the percent by number of said elements B is from 10% to 65% of the total number of elements in said bed or (2) the percent by volume of said elements B is 5% to 50% by volume of the total volume of said bed.

12. A bed of claim 3 wherein either (1) the percent by number of said elements B is from 20% to 55% of the total number of elements in said bed or (2) the percent by volume of said elements B is 5% to 30% by volume of the total volume of said bed.

13. Method of making a packed bed of extended surface packing elements comprising mixing a plurality of non-catalytic extended surface packing elements A and a plurality of non-catalytic extended surface packing elements B, packing elements A being of a substantially uniform size and packing elements B being of smaller size than said packing elements A yet at least substantially equal in size to the interstitial inter-element void spaces which would be formed in a bed of packing elements A alone, and placing the mixture so formed into a container to form a non-mobile packed bed of packing elements A and B having substantially similar design configurations.

14. Method of claim 13 wherein said mixing is conducted in a tumbling drum.

15. Method of claim 13 wherein said packing elements B comprise 10% to 65% by number of the total number of packing elements in the mixture formed.

16. Method of claim 13 wherein said packing elements B comprise 20% to 55% by number of the total packing elements in the mixture formed.

17. Method of claim 13 wherein said packing elements B are of a single substantially uniform size.

* * * * *